UNITED STATES PATENT OFFICE.

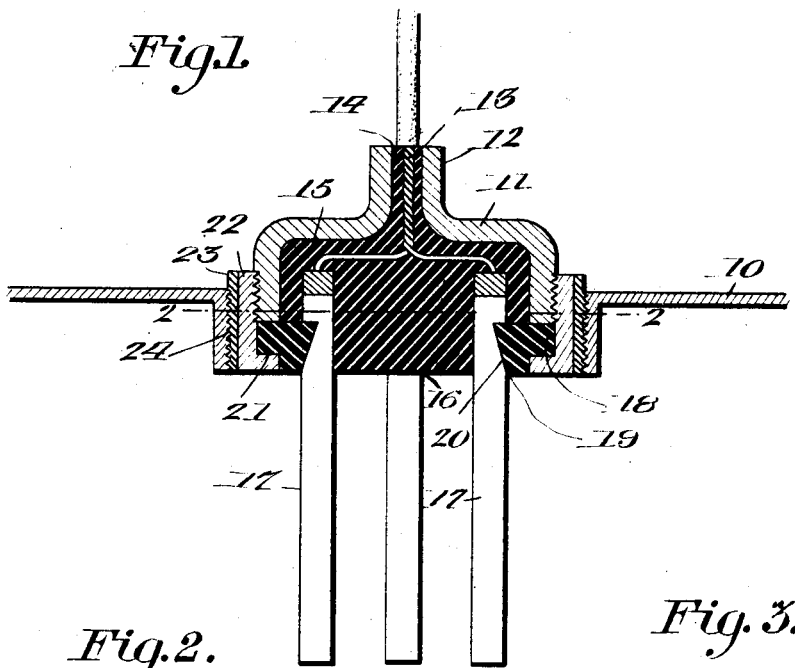
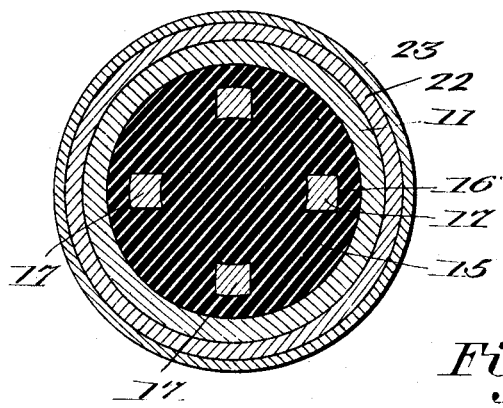
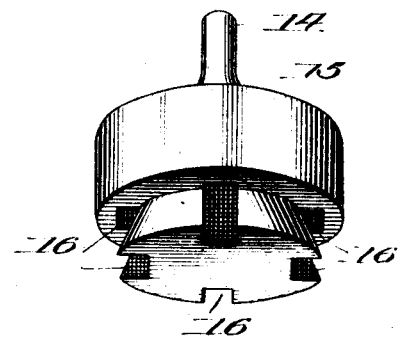
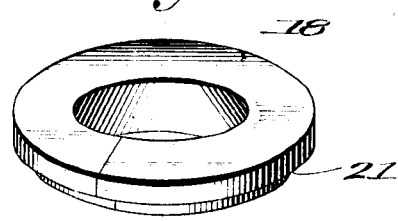

JOHN NATHAN, OF COUTOLENC, CALIFORNIA.

ELECTRIC HEATER.

1,065,465.

Specification of Letters Patent.

Patented June 24, 1913.

Application filed October 2, 1912. Serial No. 723,543.

*To all whom it may concern:*

Be it known that I, JOHN NATHAN, a subject of the King of Great Britain, residing at Coutolenc, in the county of Butte and State of California, have invented new and useful Improvements in Electric Heaters, of which the following is a specification.

An object of the invention is to provide an electric heater for use in heating fluids and the like.

The invention embodies, among other features, a device that is particularly adapted for use in receptacles containing fluids and in which it is desired to heat the fluid, such as steam tables, percolators and other heating receptacles.

In the further disclosure of the invention reference is to be had to the accompanying drawings, constituting a part of this specification, in which similar characters of reference denote corresponding parts in all the views, and in which:

Figure 1 is a horizontal sectional view of my device; Fig. 2 is a vertical transverse sectional view taken on the line 2—2 in Fig. 1; Fig. 3 is a perspective view of the insulating holder; and Fig. 4 is a perspective view of the insulating collar.

Referring more particularly to the views, I disclose a fragmentary portion of a steam table 10, adapted to contain a fluid such as water and which it is desired to heat by electricity. A shell 11 is provided with an integral tubular portion 12 through which suitable electric wires 13 are passed, the said wires being inclosed in a tubular end 14 of a holder 15, arranged within the shell 11, the mentioned holder being preferably made of insulating material such as hard rubber with the wires 13 passing therethrough as shown, the tubular end 14 of the holder 15 being arranged within the tubular portion 12 of the shell 11 and the said holder having a series of openings 16 therein in which are mounted the ends of electrodes 17, having the ends of the wires 13 connected thereto to supply the electrodes 17 with electric current and heat the same.

In order to secure the electrodes 17 rigidly on the holder 15, a collar 18, preferably formed of a pliable rubber and provided with stop flanges 19, is arranged to encircle the electrodes 17 with the flanges 19 extending into notches 20 formed in the electrodes, thus securing the electrodes on the holder 15, the said collar 18, adjacent the peripheral edge thereof, being cut away to form a circular seat 21 adapted to be engaged by a circular head 22 formed with a securing member 23, said head 22 having threaded connection with the shell 11, the peripheral surface of the securing member 23 being provided with threads 24 having connection with the steam table 10 as shown.

Although I have described my device as used in connection with a steam table, it will be understood that the same can be employed in connection with various other receptacles or articles constructed for the purpose of heating fluid.

Having thus described my invention, I claim:

1. In a device of the class described, the combination with a shell having an integral tubular portion, of an insulated holder within the shell and having a tubular end encircled by the tubular portion of the holder, electrodes mounted in openings formed in the said holder and arranged in spaced relation thereon, a collar encircling the said electrodes, flanges on the said collar and projecting into notches in the electrodes, a seat formed on the collar, and a securing member adapted for engagement with the seat of the said collar and having threaded connection with the said shell.

2. In a device of the class described, the combination with a shell, of a holder therein, electrodes mounted on the said holder, wires extending through an opening in the shell and the said holder and having connection with the said electrodes, a collar encircling the electrodes, flanges on the collar extending into notches in the electrodes to secure the electrodes in position on the holder, and a securing member engaging the collar and having threaded connection with the said shell.

In testimony whereof I affix my signature in presence of two witnesses.

JOHN NATHAN.

Witnesses:
R. W. QUACKENBUSH,
E. C. SATTERLEE.